United States Patent [19]
Batten

[11] Patent Number: 6,019,894
[45] Date of Patent: Feb. 1, 2000

[54] APPLIANCE DRAIN ASSEMBLY

[75] Inventor: William C. Batten, Asheboro, N.C.

[73] Assignee: Clearline Systems, Inc., Asheboro, N.C.

[21] Appl. No.: 08/969,207

[22] Filed: Nov. 13, 1997

[51] Int. Cl.[7] .............. F16L 9/00; A47J 27/00; B01D 35/18
[52] U.S. Cl. .......... 210/175; 210/248; 138/177; 138/DIG. 11; 99/444; 99/446
[58] Field of Search .............. 99/400, 408, 444, 99/375, 425, 446; 138/177, DIG. 11, 178, 39; 210/248, 175; 4/650; 405/80; 137/833, 861

[56] References Cited

U.S. PATENT DOCUMENTS

| | | | |
|---|---|---|---|
| 3,998,589 | 12/1976 | Rechtsteiner et al. | 21/58 |
| 4,162,546 | 7/1979 | Shortell | 4/191 |
| 4,540,015 | 9/1985 | Henricksen et al. | 137/240 |
| 4,572,230 | 2/1986 | Mirabile | 137/240 |
| 4,817,582 | 4/1989 | Oslin et al. | 126/21 |
| 4,983,284 | 1/1991 | Batten | 210/187 |
| 5,014,679 | 5/1991 | Childs et al. | 126/21 |
| 5,085,244 | 2/1992 | Funk | 137/240 |
| 5,178,754 | 1/1993 | Batten et al. | 210/138 |
| 5,200,085 | 4/1993 | Rudolf et al. | 210/703 |
| 5,499,577 | 3/1996 | Tommasini | 99/476 |
| 5,567,079 | 10/1996 | Felder | 405/80 |
| 5,619,983 | 4/1997 | Smith | 126/348 |
| 5,790,619 | 8/1998 | Peck | 376/299 |

*Primary Examiner*—David Lacey
*Assistant Examiner*—Drew Becker
*Attorney, Agent, or Firm*—Rhodes & Mason, PLLC

[57] ABSTRACT

An assembly for connection to the drain of a cooking appliance which diverts low volume flow effluent from the drain is disclosed. The assembly includes a pipe defining a main flow channel. An auxiliary exit port is connected to said pipe in such a way that the low volume flow will be diverted from the pipe into said auxiliary exit port. A hot water entry pipe port is also connected to said pipe and is in connection with a hot water source which provides a flow of hot water into said pipe. Additionally, a solenoid valve regulates the flow of hot water into said pipe.

29 Claims, 2 Drawing Sheets

APPLIANCE DRAIN ASSEMBLY

BACKGROUND OF THE INVENTION

The present invention relates generally to a drain assembly for a cooking appliance and, more particularly, to a drain assembly for diverting cooking effluent into a grease/water separator.

A combination oven uses both steam and radiant heat in the cooking process. Typically, these ovens use a steam kettle to generate steam for the cooking chamber. The steam kettle must be periodically flushed to remove any limes, scales, or precipitate from the steam kettle. The flush cycle completely purges the water in the kettle by means of an internal pump or line pressure arrangement. This flush sequence can propel twenty to twenty-five liters of water through the kettle and into the combination oven. The flush water exits a discharge port in the oven in a short (30 to 60 second) time frame. These ovens typically use a condensate discharge pipe with an outer diameter of 50 millimeters. Therefore, the entire pipe cross section must be available to allow for such a high volume of water to be discharged in that time.

However, during the cooking process, condensed steam and grease exit the cooking area of the oven through the same discharge port in the oven as the flush water flow. This flow of condensed steam and grease exits at a much lower flow rate. It typically has been directed through the same drain line with its eventual discharge into a sewage outlet. In many applications, the grease tends to solidify within the drain pipe. Once that blockage occurs, the large flow of flush water cannot escape the drain pipe at a proper rate of speed. This backup may cause water to pool in the bottom of the appliance or leak out of the appliance through areas other than the drain. This backup may also cause contamination of the cooking racks and/or the food products placed on the cooking racks. Thus, there is a need to ensure that the drain pipe remains clear from any grease or other residue.

Further, the clogging of the drain pipe by the condensate from the cooking appliance causes drainage problems with other appliances connected to the drain pipe. Thus, there is a need to separate components of the condensate flow which could cause an obstruction within the drain pipe. In that regard, there is a need to divert the condensate to a grease/water separator or other pollution control device so that those components can be separated from the condensate stream thereby allowing a flow that is predominantly water to be discharged into the building's drain system.

SUMMARY OF THE INVENTION

The present invention is directed to a drain assembly to be attached between the discharge port of a cooking appliance and the drain line for a building. The cooking appliance may be a combination oven. The drain assembly is designed so that low volume effluent will be diverted from the main flow channel of the assembly so that periodic high volume flows may flow unobstructed through the assembly.

Accordingly, one aspect of the invention is to provide an accumulator on a pipe. The pipe defines the main flow channel. The accumulator provides a path to which the low volume flow can be gravitationally diverted. The low volume flow will then be discharged through an exit port in the accumulator.

Another aspect of the invention is to reduce the likelihood that components of the low volume flow will obstruct the main flow channel. Thus, a heat source is located in proximity to the accumulator. The heat source is sufficient to melt any meltable components of that low volume flow, such as cooking grease.

The assembly is typically cylindrical with an outer diameter of about 50 millimeters. The assembly is preferably made with 16 gauge bright finish stainless steel.

In an embodiment of the invention, the accumulator is attached to the pipe so that the accumulator spans across the lowest arc segment of the pipe. The accumulator may also be substantially cylindrical with its cross section having a diameter of about one inch. The accumulator preferably extends from the pipe for a depth of approximately 0.20 inches.

In order to ensure that all of the low volume flow is diverted, the accumulator preferably has two extensions extending from its upper surface upward along opposite sides of the pipe. The width of the extensions may taper as they extend along the pipe. The exit port may be a circular hole with a diameter of about 0.75 inches centered in the lower end of the accumulator.

The low volume flow may be conducted from accumulator into a grease/water separator such as a Big Dipper® oil/water separator marketed by Thermaco, Inc., of Asheboro, N.C. It may be preferable to conduct the low volume flow from the accumulator to the grease/water separator using a suction pump.

Understanding that the purpose of the assembly is to maintain the main flow channel free from obstruction, such as cooking grease, in another aspect the invention maintains a heat source within close proximity to the assembly. The heat source keeps the components of the low volume flow above their respective melting points thus preventing coagulation of solids within the main flow channel.

In a preferred embodiment, the heat is provided by hot water flowing into the assembly. The hot water enters the assembly through an entry port which is upstream of the auxiliary exit port. The flow of hot water may be regulated by a solenoid valve. The heat source may also be an electrical heater.

In the process of the invention, the cooking appliance is periodically purged with a high volume flow of water to clear residue. This flow of water is drained through a drain assembly connected to the cooking appliance. Between the purgings, effluent from the cooking appliance drains into the drain assembly and then, within the drain assembly, is diverted from the main flow path used by the high volume flow.

In a preferred embodiment of this process, the drain assembly is heated. The heat will maintain the cooking effluent in a liquid state so that it will flow and not obstruct the main flow path of the drain assembly. The heat is preferably provided by flowing hot water into the drain assembly. The flow of hot water may be regulated by a solenoid valve, or other suitable means, before it is introduced into the drain assembly.

It is preferable to divert the cooking effluent into an accumulator attached to the drain assembly. Subsequently, the effluent may be conducted into a grease/water separator in order for the grease and water components of that effluent to be properly disposed of. The effluent can be conducted to such a grease/water separator by using a suction pump in connection with the accumulator.

It should be understood that the apparatus, and the associated process, can be used with cooking appliances other than combination ovens, such as rotisserie ovens and the like.

DESCRIPTION OF THE PREFERRED EMBODIMENTS

Figure 1:
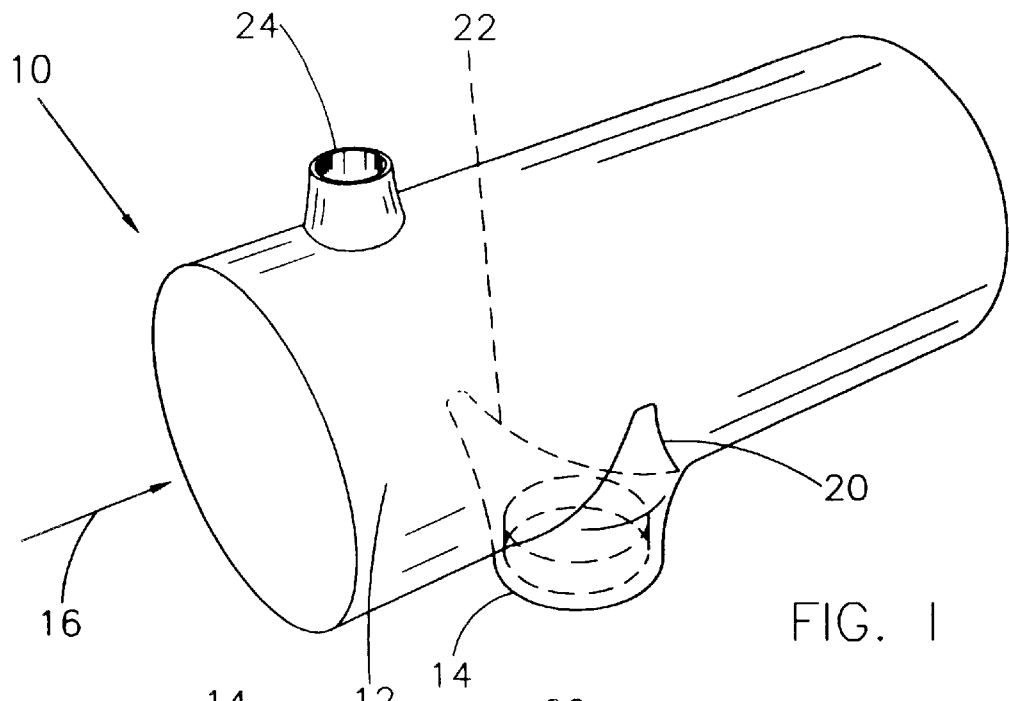
FIG. 1 is a perspective view illustrating an embodiment of the drain assembly according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

It will be understood that the illustrations are for the purpose of describing a preferred embodiment of the invention and are not intended to limit the invention thereto.

As best seen in FIG. 1, a drain assembly, generally designated number 10, is shown constructed in accordance with the present invention. The drain assembly 10 is primarily constructed of a pipe 12 which defines a main flow channel 16. The main flow channel has a diameter sufficient to accommodate periodic purgings of a cooking appliance. An accumulator 14 spans across the lowest arc segment of the pipe 12. The accumulator 14 has a first extension 20 and a second extension 22 extending upward along opposite sides of the pipe 12 and tapering in width as each one extends upwardly. The extensions 20 and 22 are connected to the accumulator 14 and are designed to divert a low volume flow in the pipe 12 into the accumulator 14. Thus the entire volume of the Low volume flow is highly likely to be diverted to the accumulator 14 by the force of gravity since the accumulator 14 provides a drop off to a lower level along the lowest arc segment. The extensions 20 and 22 of the accumulator 14 may be made by outward embossment of the wall of pipe 12. Alternatively, they may be preformed and attached, as by welding to cover a cut-out in the wall of pipe 12. Other suitable fabrication techniques may also be used.

In a preferred embodiment of the invention, a heat source is located proximate to the drain assembly 10. As can be seen in FIG. 1, a hot water entry port 24 is connected to the pipe 12. The hot water entry port 24 is located on the pipe 12 in a manner so that hot water can flow into the pipe 12 to maintain the low volume flow in a liquid state and prevent components of the low volume flow from blocking the main flow channel 16 and the accumulator 14. The hot water entry port 24 is preferably located generally upstream of, and generally above, the accumulator 14.

As can be seen in FIG. 1, the pipe 12 generally has a cylindrical body, preferably constructed of 16-gauge stainless steel.

Figure 2:
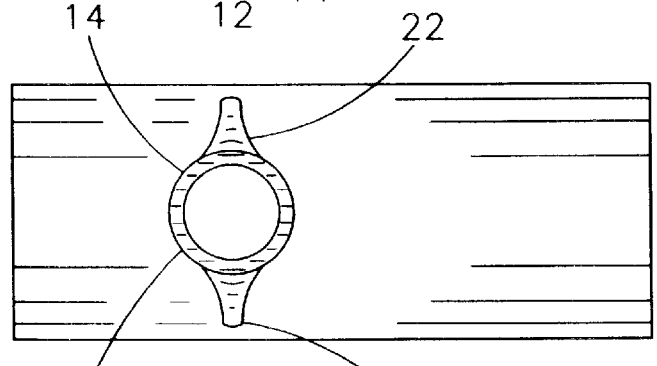
FIG. 2 is a bottom plan view of the drain assembly shown in FIG. 1.
Figure 3:
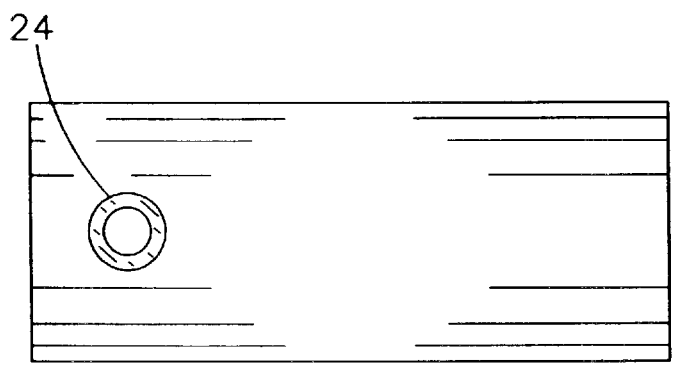
FIG. 3 is a top plan view of the drain assembly shown in FIG. 1.

As can be seen in FIG. 2, the accumulator 14 is generally cylindrical and has an exit port 26 located within it.

Figure 4:
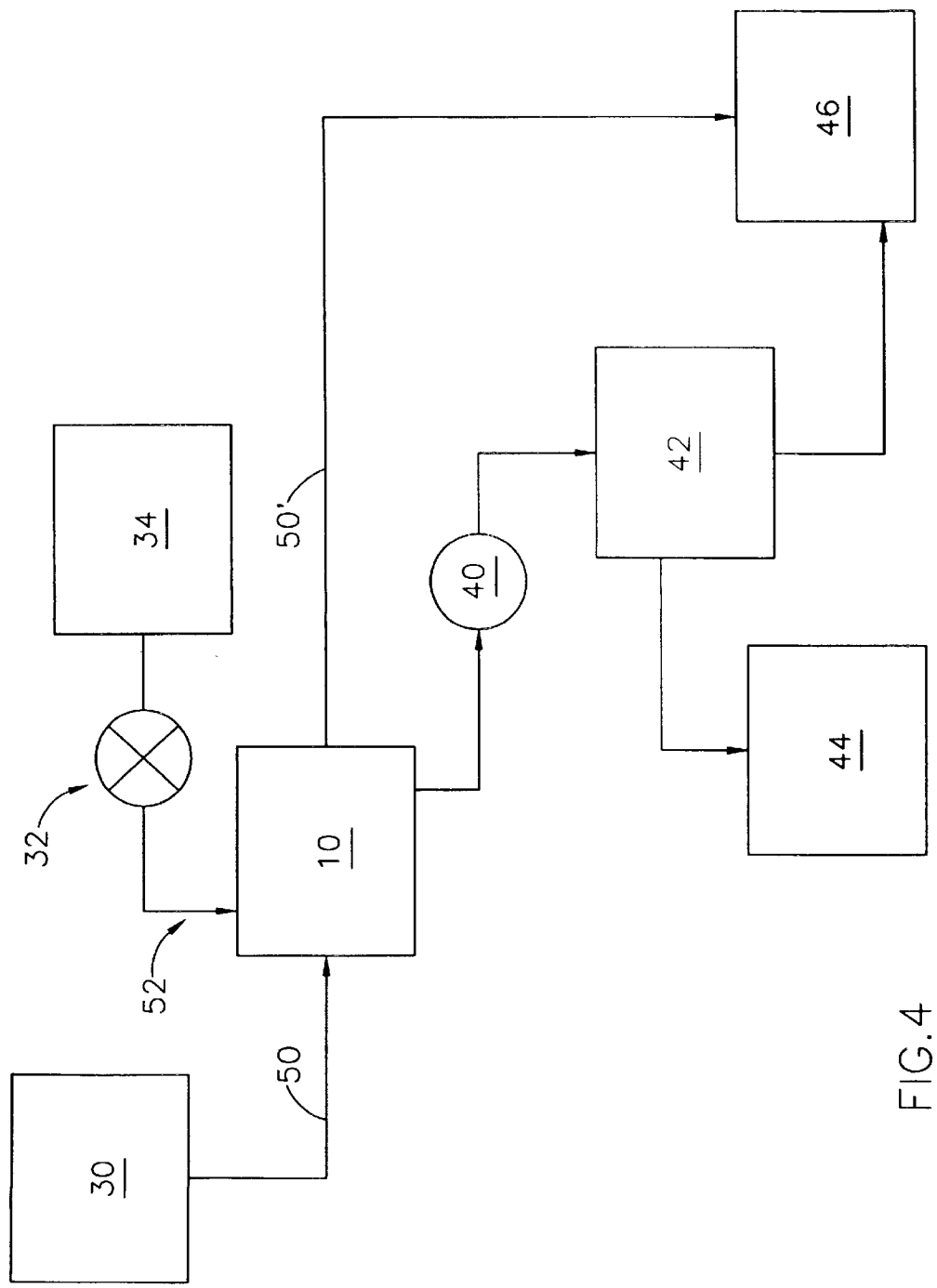
FIG. 4 is a schematic representation of the drain assembly in a kitchen setting according to the invention.

A schematic representation of a typical drain assembly in a kitchen setting can be seen in FIG. 4. The cooking appliance 30 is connected via a discharge pipe 50 to the drain assembly 10. The main flow path of the drain assembly 10 exits through a second discharge pipe 50' into the building drain 46. A suction pump 40 is connected to the exit port 26 of the accumulator 14 in a path divergent from the main flow channel of the drain assembly 10. The suction pump 40 pumps the effluent into a grease/water separator 42. Grease components 44 can be separated and removed, while a flow of water and other components less grease can pass to the building drain 46. A hot water source 34 (such as the building's hot water supply) is connected to the drain assembly 10 through a conduit 52. The flow of hot water through the conduit 52 may be regulated by a solenoid valve 32. Value 32 may be opened periodically by controls provided on the cooking appliance 30, or separate controls.

In operation, the system begins when a cooking appliance 30 is activated to begin the cooking process. Typically, a combination oven utilizes a steam kettle that has a flush cycle in the beginning of that cooking process. Of course, the flush cycle could take place after the cooking cycle. The flush cycle completely changes the water in the steam kettle by means of an internal pump or line pressure arrangement. This flush sequence generates a high volume of water which is flushed through the cooking appliance and out the oven condensate discharge port into a discharge pipe 50 in a short time frame. This high volume flush flow usually requires the entire pipe cross section of the discharge pipe 50 be open to allow the expeditious flow out of the combination oven 30. As can be seen in FIG. 4, this high volume flush flow will enter the drain assembly 10 and exit through second discharge pipe 50' without being diverted. The flush flow will enter the building drain 46 unimpeded. The flush flow is high volume, but only for a brief period of time.

During the cooking cycle, the cooking appliance 30 dispenses steam into its cooking cabinet (not shown) to cook the food. Any fats, grease, or other material drains to the bottom of the cooking cabinet with condensate from the steam. This makes a low volume effluent of condensate and cooking residue that exits the cooking appliance 30 through the discharge pipe 50 and enters the drain assembly 10. This low volume flow is gravitationally diverted into the accumulator 14 in the drain assembly. This flow is then suctioned by a pump 40 into a grease/water separator 42 The grease/water separator 42 separates the grease components 44 for proper handling, and allows the rest of the flow to be sent to the building drain 46. As can be seen in FIG. 4, to prevent the drain assembly 10 from having any blockage, a hot water source 34 is connected to the drain assembly 10 to allow for hot water to flow through a conduit 52 into the drain assembly 10 and maintain the low volume flow in a liquid state. A valve 32 regulates the hot water flow and is typically activated at the same time that the cooking cycle is begun.

Certain modifications and improvements will occur to those skilled in the art upon a reading of the foregoing description. It should be understood that all such modifications and improvements have been deleted herein for the sake of conciseness and readability but are properly within the scope of the following claims:

What is claimed is:

1. An assembly for connection to a drain that periodically passes water and a meltable component to divert lower volume effluent from a main flow channel so that periodic higher volume flows may be unobstructed, said assembly comprising:
   (a) a pipe having
      (i) an inner surface and
      (ii) an inlet and an outlet and
      (iii) a main flow channel extending between said inlet and said outlet, said main flow channel allowing unimpeded flow of said periodic higher volume flows (b) an accumulator spanning a lowest arc segment of the pipe, the accumulator extending outward of said inner surface to enable said lower volume effluent in said main flow channel to be diverted into and accumulated within said accumulator; and (c) an exit port in said accumulator.

2. The assembly of claim 1 further comprising:
a heat source located proximate said accumulator to melt the meltable component of said lower volume effluent to prevent obstruction of said lower volume effluent.

3. The assembly of claim 1 wherein said pipe is substantially cylindrical.

4. The assembly of claim 3 wherein said pipe has an outer diameter of about 50 millimeters.

5. The assembly of claim 1 wherein said pipe is made from stainless steel.

6. The assembly of claim 1 wherein said pipe is made from 16 gauge bright finish stainless steel.

7. The assembly of claim 1 wherein said accumulator is substantially cylindrical.

8. The assembly of claim 1 wherein said accumulator is substantially cylindrical and has a diameter of about one inch.

9. The assembly of claim 1 wherein said accumulator has a depth measured from said inner surface of at least 0.20 inches.

10. The assembly of claim 1 wherein said accumulator is cylindrical and has an upper edge connected to said inner surface and further comprises a first extension and a second extension, said extensions being connected to said upper edge on opposite sides and said extensions extending upwardly along said inner surface.

11. The assembly of claim 10 wherein said extensions have a width aligned with said main flow channel in which said width tapers as said extensions extend upwardly.

12. The assembly of claim 1 wherein said accumulator has a lower end and said exit port is centered within said lower end.

13. The assembly of claim 10 wherein said exit port is a circular hole with a diameter of about 0.75 inches.

14. The assembly of claim 1 wherein said exit port is fixedly connected to a conduit to conduct the lower volume effluent.

15. The assembly of claim 1 further comprising:
a grease/water separator in connection with said exit port to separate grease and water in said lower volume effluent.

16. The assembly of claim 1 further comprising:
a suction pump with an inlet and an outlet, said suction pump inlet in connection with said exit port; and
a grease/water separator in connection with said suction pump outlet to separate grease and water in said lower volume effluent.

17. An assembly for connection to a drain that periodically passes water and a meltable component to divert lower volume effluent from a main flow channel so that periodic higher volume flows may be unobstructed, said assembly comprising:

(a) a pipe having
   (i) an inlet and an outlet and
   (ii) a main flow channel extending between said inlet and said outlet, said main flow channel allowing unimpeded flow of said periodic higher volume flows and
   (iii) an inner surface with a lowest arc segment;

(b) a substantially cylindrical accumulator with a lower end, said accumulator extending only outwardly from said inner surface and spanning across a lowest arc segment of said inner surface;
   (i) said accumulator having first and second extensions, each such extension having a width aligned with said main flow channel, said extensions connected to opposite sides of said accumulator and extending and tapering upwardly along said inner surface; and
   (ii) an exit port at a lower end of said accumulator;

(c) a suction pump with an inlet and an outlet, said suction pump inlet being in communication with said exit port; and (d) a grease/water separator to separate grease and water components of said lower volume effluent, said grease/water separator in communication with said suction pump outlet.

18. An assembly for connection to a drain that periodically passes water and a meltable component to divert lower volume effluent from a main flow channel so that periodic higher volume flows may be unobstructed, said assembly comprising:

(a) a pipe defining a main flow channel that allows unimpeded flow of said periodic higher volume flows;

(b) an auxiliary exit port within said pipe to allow said lower volume effluent to be diverted from said main flow channel into said auxiliary exit port;

(c) an accumulator in connection with said auxiliary exit port, the accumulator spanning a lowest arc segment of the pipe and extending outward of said pipe, said accumulator to maintain at least a portion of said lower volume effluent; and (d) a heat source located proximate said auxiliary exit port to heat the meltable components of said lower volume effluent above a melting point thereof to prevent obstruction within said lower volume effluent.

19. The assembly of claim 18 wherein said pipe has a main flow inlet, a main flow outlet and, a hot water entry port connected to said pipe between said main flow inlet and said auxiliary exit port, wherein said heat source comprises a hot water flow from a hot water source introduced into said pipe through said hot water entry port.

20. The assembly of claim 19 wherein said heat source further comprises a conduit connected to said hot water entry port and a solenoid valve to regulate said hot water flow within said conduit.

21. The assembly of claim 18 wherein said low volume flow comprises grease and water and said heat source provides heat sufficient to prevent coagulation of said grease within said exit port.

22. The assembly of claim 18 wherein said heat source is an electrical heater.

23. The assembly of claim 18 further comprising:
an oil/water separator in communication with said exit port to separate oil and water in said lower volume effluent.

24. The assembly of claim 18 further comprising:
a suction pump with a suction pump inlet and an outlet, said inlet in communication with said exit port; and
an oil/water separator in communication with said suction pump outlet to separate oil and water in said lower volume effluent.

25. An assembly for connection to a drain that periodically passes water and a meltable component to divert lower volume effluent from a main flow channel so that periodic higher volume flows may be unobstructed, said assembly comprising:

(a) a pipe with a main flow inlet and a main flow outlet, said pipe defining a main flow channel, said main flow channel allowing unimpeded flow of said periodic higher volume flows;

(b) an auxiliary exit port within said pipe to allow said lower volume effluent to be diverted from said main flow channel into said auxiliary exit port;

(c) an accumulator connected to said auxiliary exit port, the accumulator spanning a lowest arc segment of the pipe and extending upward of said pipe, said accumulator to maintain at least a portion of said lower volume effluent;

(d) a hot water entry port connected to said pipe between said main flow inlet and said auxiliary exit port;

(e) a hot water source in connection with said hot water entry port, said hot water source providing a hot water flow into said hot water entry port; and (f) a solenoid valve to regulate said hot water flow from said hot water source.

26. An assembly for connection to a drain that periodically passes water and a meltable component to divert lower volume effluent from a main flow channel so that periodic higher volume flows may be unobstructed, said assembly comprising:

(a) a pipe having an inner surface, a main flow inlet and a main flow outlet;

(b) an accumulator having a lower surface and an upper edge extending only outwardly from said pipe so that said lower volume effluent will be diverted into said accumulator, said accumulator being generally cylindrical and spanning a lowest arc segment of the pipe with a first embossed extension and a second embossed extension, said embossed extensions being connected to said upper edge and extending upwardly along said inner surface and said extensions tapering as said extensions extend upwardly from said upper edge;

(c) an exit port in said lower surface of said accumulator;

(d) a hot water supply conduit connected to said pipe through a hot water entry port, said hot water entry port located on said pipe between said main flow inlet and said accumulator;

(e) a solenoid valve connected to said hot water supply conduit;

(f) a suction pump having an inlet and an outlet, said suction pump inlet in connection with said exit port; and (g) a grease/water separator connected to said suction pump outlet.

27. An assembly for connection to a drain that periodically passes water and a meltable component to divert lower volume effluent from a main flow channel so that periodic higher volume flows may be unobstructed, said assembly comprising:

(a) a pipe having an inner surface and a main flow channel, said main flow channel being free from permanent structures;

(b) an accumulator bulging outwardly from said pipe, and spanning a lowest arc segment of said inner surface said accumulator defining an opening in said inner surface having an opening cross-sectional area, and (c) an exit port in said accumulator wherein said exit port is smaller than said opening cross-sectional area.

28. The assembly of claim 26 further comprising:

a heat source located proximate said accumulator to melt a meltable component of said lower volume effluent to prevent obstruction within said main flow channel.

29. The assembly of claim 26 further comprising:

a grease/water separator in connection with said exit port to separate grease and water in said lower volume effluent.

* * * * *